US008572562B2

(12) United States Patent  
Huang et al.

(10) Patent No.: US 8,572,562 B2  
(45) Date of Patent: Oct. 29, 2013

(54) METHOD, APPARATUS AND SYSTEMS THEREOF FOR IMPLEMENTING NON-FUNCTION LOGIC EXTENSIBLY

(75) Inventors: He Yuan Huang, Beijing (CN); Hua Fang Tan, Beijing (CN); Jian Xu, Haidian District (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1319 days.

(21) Appl. No.: 12/209,256

(22) Filed: Sep. 12, 2008

(65) Prior Publication Data

US 2009/0077546 A1 Mar. 19, 2009

(30) Foreign Application Priority Data

Sep. 14, 2007 (CN) .......................... 2007 1 0153691 9

(51) Int. Cl.
*G06F 9/44* (2006.01)

(52) U.S. Cl.
USPC ............................. 717/120; 717/104; 717/107

(58) Field of Classification Search
None
See application file for complete search history.

(56) References Cited

U.S. PATENT DOCUMENTS

| 6,742,176 | B1 * | 5/2004 | Million et al. ................ 717/120 |
| 7,512,965 | B1 * | 3/2009 | Amdur et al. ....................... 726/1 |
| 7,665,071 | B1 * | 2/2010 | Roles et al. ...................... 717/104 |
| 8,010,991 | B2 * | 8/2011 | Sarukkai et al. .................. 726/1 |
| 8,122,426 | B2 * | 2/2012 | Isom ............................. 717/107 |
| 8,250,666 | B2 * | 8/2012 | Karabulut et al. ............ 717/120 |
| 8,370,906 | B2 * | 2/2013 | Wen et al. ..................... 717/120 |
| 2003/0110312 | A1 * | 6/2003 | Gunduc et al. ................ 709/328 |
| 2004/0003371 | A1 * | 1/2004 | Coulthard et al. ............. 717/101 |
| 2004/0221261 | A1 * | 11/2004 | Blevins ........................ 717/107 |
| 2005/0097146 | A1 * | 5/2005 | Konstantinou et al. ........ 707/200 |
| 2005/0102536 | A1 * | 5/2005 | Patrick et al. ................. 713/201 |
| 2005/0251809 | A1 * | 11/2005 | Gunduc et al. ............... 719/310 |
| 2005/0251852 | A1 * | 11/2005 | Patrick et al. ..................... 726/1 |
| 2005/0262362 | A1 * | 11/2005 | Patrick et al. ................. 713/193 |

(Continued)

OTHER PUBLICATIONS

Gabriel A. Moreno, "Creating Custom Containers with Generative Techniques", 2006 ACM, GPCE'06 Oct. 22-26, 2006, Portland, Oregon, USA, pp. 29-38; <http://dl.acm.org/citation.cfm?id=1173712>.*

(Continued)

*Primary Examiner* — Thuy Dao  
*Assistant Examiner* — Ben C Wang  
(74) *Attorney, Agent, or Firm* — William Stock; Anne Vachon Dougherty

(57) ABSTRACT

A method, apparatus, system, and computer program products for implementing non-function logic extensibly and independently of functional logic, the method comprising the steps of: acquiring association relationship between a policy and a required plug-in based on a loaded policy demand configuration; generating a plug-in context definition according to the acquired association relationship, the plug-in context definition being part of a plug-in context associated with the plug-in, wherein the plug-in context defines services provided by the plug-in and reference to other plug-ins related to the plug-in; and generating a plug-in context object based on the plug-in context definition, wherein the plug-in context object is an instantiated plug-in context definition. According to the method of the present invention, it is possible to perform inexplicit invocation of infrastructure service plug-ins according to application configuration without querying plug-in registry, and better performance is acquired in the process of invoking plug-ins.

13 Claims, 6 Drawing Sheets

(56) References Cited

U.S. PATENT DOCUMENTS

| | | | |
|---|---|---|---|
| 2006/0020679 A1* | 1/2006 | Hinton et al. | 709/217 |
| 2006/0021017 A1* | 1/2006 | Hinton et al. | 726/10 |
| 2006/0136990 A1* | 6/2006 | Hinton et al. | 726/2 |
| 2006/0230382 A1 | 10/2006 | Moulckers | |
| 2006/0230383 A1* | 10/2006 | Moulckers et al. | 717/120 |
| 2007/0124797 A1 | 5/2007 | Gupta | |
| 2007/0156913 A1* | 7/2007 | Miyamoto et al. | 709/230 |
| 2007/0180426 A1* | 8/2007 | Moulckers et al. | 717/120 |
| 2009/0125520 A1* | 5/2009 | Moulckers et al. | 717/120 |
| 2009/0259753 A1* | 10/2009 | Hinton et al. | 709/226 |
| 2010/0005449 A1* | 1/2010 | Karabulut et al. | 717/120 |
| 2010/0186089 A1* | 7/2010 | Fu et al. | 717/107 |
| 2012/0131543 A1* | 5/2012 | Sundararajan et al. | 717/104 |

OTHER PUBLICATIONS

Chang et al., "Patterns for Integrating and Exploiting Some Non-Functional Properties in Hierarchical Software Components", 2007 IEEE, ECBS'07, pp. 1-10; <http://ieeexplore.ieee.org/stamp/stamp.jsp?tp=&arnumber=4148922>.*

Caron et al., "A Coding Framework for Functional Adaptation of Coarse-Grained Components in Extensible EJB Servers", 2009 Springer-Verlag Berlin Heidelberg, Tools Europe 2009, LNBIP 33, pp. 215-230, 2009; <http://link.springer.com/content/pdf/10.1007%2 F978-3-642-02571-6_13. pdf>.*

* cited by examiner

METHOD, APPARATUS AND SYSTEMS THEREOF FOR IMPLEMENTING NON-FUNCTION LOGIC EXTENSIBLY

TECHNICAL FIELD

This invention relates to the implementation of software development platform, more specifically, a method, apparatus and their systems that are capable of implementing non-function logic extensibly and independently of function logic.

BACKGROUND TECHNOLOGY

One of the major causes for the current commercial applications being not flexible enough lies in the inseparable and unmanageable tangle of function concerns and non-function concerns, wherein the function concerns refer to commercial functions and logics while the non-function concerns refer to the aspects such as performances, security, monitoring, and extensibility. For the program codes, the crosscutting of function concerns and non-function concerns increases the complexity significantly and results in difficulty in comprehension, construction, expansion, and reuse, for example:

Comprehension: The commercial logic codes are woven with the codes related to NFR (non-function requirement), so it is difficult for people to comprehend the codes from a single prospect;

Construction: It is necessary to develop codes prudently to take into account the function aspects and non-function aspects, and higher work load and more skills are required accordingly;

Expansibility: It is fairly difficult to modify codes in case function or non-function demands vary;

Reuse: It is very difficult to reuse function or non-function codes only.

Consequently, just as the still more detailed explanation presented as follows, the separation of concerns becomes the major targets and path for modern software technologies including AOP (Aspect Oriented Programming) and J2EE (Java™ 2 Platform Enterprise Edition Specification) etc. However, utilization of these technologies is confronted with extreme restraint. On the one hand, AOP can only process simple NFR tasks such as log. On the other hand, even though a container is introduced into J2EE such that the latter may process complicated NFR issues (for instance, transaction), it is generally time consuming to add such NFR supports, and it also requires adequate understanding of container implementation and relevant skills. It is fairly difficult to implement customization support and specialized NFR support in the current J2EE containers, resulting in a fact that only some general NFRs are supported in J2EE, with the remaining NFRs still mingled with the function codes.

AOP is a programming paradigm that was presented in 1990s by Xerox PARX Company. AOP enables the developer to separate the concerns. Many non-function services such as log, security inspection, and transaction management etc. are thus separated from function services. Moreover, function services may share these non-function services. In case non-function behavior varies, these function services require no amendment, and only the non-function services require amendment.

According to the results of investigation conducted by AOSD (Aspect-Oriented Software Development, relevant reference is available in the Internet website aosd.net), there are approximately 100 kinds of AOP implementations For AOP implementation based on Java, there are over 20 kinds of implementations. Several kinds of relatively mature AOP implementations are hereby listed as follows:

1. AspectJ

AspectJ (trademark) (relevant reference is available on Internet website eclipse.org under aspectj) is a type of general aspect-oriented extension of Java. Prior to being disposed, AspectJ may conduct weaving while compiling. AspectJ is a type of static weaving that utilizes a pre-compiler to enhance the source codes. AspectJ is a type of mature AOP implementation, however, it is very complicated and requires a special-purpose Java compiler.

2. AspectWerkz

AspectWerkz (trademark) (relevant reference is available on Internet website aspectwerkz.codehous.org) is a type of dynamic AOP framework. AspectWerkz may modify Java byte codes in order to implement aspect weaving. Weaving takes place in two different phases, of which, one phase is a class loading phase, and the other is an activating phase.

3. SpringFramework

SpringFramework (trademark) (relevant reference is available on Internet website springframework.org under documents/wiki/Spring AOP Framework) is a type of AOP framework based on dynamic proxy, in which the dynamic proxy comes from proxy design mode. Dynamic proxy need not generate a proxy for each active service object. It has to fulfill proxy generating for the interfaces and proxies to be activated, and the runtime will generate the proxy object. SpringFramework uses as default the proxy mechanism provided by JDK.

4. JBoss AOP

JBoss AOP (trademark) (relevant reference is available on Internet website jboss.org under products/aop) uses Javassist to modify the byte codes so as to implement dynamic weaving during class loading.

For the known AOP implementation, the non-function portion (aspect) is still programmed with codes. The respective aspects and function codes are woven together in runtime or compiling to generate hybrid codes. Therefore, each aspect will be loaded into the memory with function code. If several function codes use one aspect and these function codes are all in the memory, the memory may have several copies of the aspect. Besides, no plug-in framework is utilized for providing AOP implementation of extension mechanism for aspect.

For instance, in some application containers of J2EE (Java™ 2 platform enterprise compiling specifications v1.4) container (relevant reference is available on the javasun website), some non-function portions that the application programs utilize frequently are separated and provided by container. At present, J2EE container supports the non-functions including authentication, transaction, and log etc. However, current J2EE does not provide an extension mechanism and framework in order to allow a third party to extend these non-function services implementations and weave them into applications.

In a book titled as "Lightweight plug-in-based application development" published in 2002 by Mayer et al., the plug-in concept was put forward as a design mode (the design mode described in the book adopted the form put forward by a book titled as "Design Patterns: Elements of Reusable Object-Oriented Software" published by Gamma et al. in 1995), and exemplary implementations in Java were given. Its architecture includes the plug-in managers of loading classes and identifying the classes that utilize reflection to implement the known interfaces as a main interface, and its relevant contents are presented detailedly in a technical report titled as "The Reflection API" published by Green et al. in Sun Microsystems, Inc. in 1997-2001, which is available on the javasun Internet website under docs/books/tutorial/reflect. The exemplary implementations proposed by Mayer et al. allow utilization of multiple plug-ins and different interfaces to extend a certain application, however, it fails to mention that plug-ins may be added to other plug-ins.

PluggableComponent provides a mode of infrastructure or architecture that allows component exchange at runtime, and relevant contents are presented in detail in an article titled as "Pluggable Component—A Pattern for Interactive System Configuration" published by Völter in EuroPLoP'99 in 1999. Characteristics of the architecture lie in registry for managing PluggableComponent of different types. The registry provides the administrator through configuration tools with a list used for configuring available components for his applications.

Eclipse platform was designed for constructing an integral development environment, its relevant contents are presented in detail in a technical report titled as "Eclipse Platform Technical Overview" published by Object Technology International, Inc. in July 2001, and the article is available on the eclipse.org Internet website under eclipse-overview. Eclipse platform is based on the mechanism that is utilized to find out, integrate, and run the components that are referred to as plug-ins. Any plug-in may define freely new extension points (relevant descriptions are also available on the above-mentioned website) and provide new API for other plug-ins. Plug-in may extend the functions of other plug-ins and extend the kernel. This provides flexibility in creating still more complicated configuration.

However, all these plug-in frameworks function on the application layer. A user request includes a designator that shows which plug-ins should be included in order to meet the request. However, in application containers, information on which non-function plug-ins should be invoked may not be given directly in only the user request.

In the USA patent application filed by Gupta et al. and published as No. US2007/0124797A1 on May 31, 2007, a method to create, manage, and execute policy in network service environment and a system for applying the system are disclosed, and these intended to separate functional logic from non-function logic as well. The system includes a policy manager, a policy executor, clients, and services. Client includes the software for requesting the services. The services indicate network services such as log-in application or operable (functional) process, and the interfaces and encryption of messages. Policy manager is applicable to designated functions such as log, authentication, encryption, and cache etc., which are not core commercial logics but provide non-function contribution really. Policy manager is used in separating commercial concerns from non-commercial concerns. Policy executor is used in monitoring and executing the policy that are configured by the policy manager. Policy manager is implemented in the application layer of OSI (open system interconnection) 7-layer model in the system, and the created policies are executed in the lower layers. No modification is made to lower layers of the network in the system. In the system, policy may be implemented as a message interceptor, so the policy may be introduced into the message flow path seamlessly. Or, the policy may be deployed into the gateway and service proxy. Gateways and proxy may intercept messages in order to implement the corresponding policy. According to the above-mentioned contents, it is obvious that the system disclosed in the patent application utilizes a policy manager to configure and meet the non-function demands, however it fails to provide an extensible method to allow the developer to extend and customize the supports for non-function demands. Besides, the method disclosed in the patent application locates the policy manager between the client and backend services, so that only the access to service interfaces can be controlled in fact, and the control of access between multiple services requires adding multiple policy managers accordingly, resulting in higher complexity of network implementation and higher implementation cost and time consumption.

Therefore, the existing technologies need a mechanism that allows easy, quick, and extensible separation of functional logic from non-function logic.

SUMMARY

To solve the above-mentioned problems of the existing technologies, this invention puts forward a method, apparatus and system thereof as well as computer program products that can implement non-function logic extensibly and independently of function logic.

To achieve the above-mentioned objective, the present invention also provides an apparatus of implementing non-function logic extensibly and independently of functional logic, comprising: an application loader for loading policy demand configuration of an application; a policy attacher for acquiring an association relationship between a policy and a required plug-in based on the loaded policy demand configuration, and for generating a plug-in context definition according to the acquired association relationship, the plug-in context definition being part of a plug-in context associated with the plug-in, wherein the plug-in context defines services provided by the plug-in and reference to other plug-ins related to the plug-in; and an application builder for generating a plug-in context object based on the plug-in context definition, wherein the plug-in context object is an instantiated plug-in context definition.

To achieve the above-mentioned objective, the present invention also provides an apparatus of implementing non-function logic extensibly and independently of functional logic, comprising: an application loader for loading policy demand configuration of an application; a policy attacher for acquiring association relationship between a policy and a required plug-in based on the loaded policy demand configuration, and for generating a plug-in context definition according to the acquired association relationship, the plug-in context definition being part of a plug-in context associated with the plug-in, wherein the plug-in context defines services provided by the plug-in and reference to other plug-ins related to the plug-in; and an application builder for generating a plug-in context object based on the plug-in context definition, wherein the plug-in context object is an instantiated plug-in context definition.

To achieve the above-mentioned objective, the present invention also provides a system for separating functional logic from non-function logic and implementing the non-function logic, including: an application layer entity configured to implement functional logic by user and utilize plug-ins provided by an infrastructure service plug-in layer entity; the infrastructure service plug-in layer entity configured to implement the plug-in by utilizing services provided by an application runtime layer entity; and the application runtime layer entity configured to implement the methods as claimed in any one of claims 1-9 for invocation of the infrastructure service plug-in layer entity.

To achieve the above-mentioned objective, the present invention also provides computer program products that include the program codes stored in the storage media of a computer, whereby the program codes may be executed so as to implement the method according to this invention.

According to a preferred embodiment of the present invention, an abstract layer is provided for the supplier of an infrastructure service, the non-function logic of the application is separated from the functional logic of the application, and the non-function configuration of the application can be modified flexibly, requiring no re-compilation or re-deployment of the application.

According to a preferred embodiment of the present invention, a runtime constructor may be somewhat modified to add some runtime extension points, for instance the extension points before or after creating component Instance: Before (After)CreatingComponentInstance, and the extension points before or after invoking service method: Before(After)InvokingServiceMethod etc. In fact, most infrastructure services such as log, security, and transaction etc. are active during the time period of these runtime extension points. In other words, extension of these extension points may implement most infrastructure services.

According to a preferred embodiment of the present invention, policy (non-function demand) registry and/or plug-in registry is introduced in. Policy registry may store the policies supported by the plug-ins, while the plug-in registry stores the relationships between plug-ins and maintains relationships among plug-ins, for example an extension relationship and/or a dependency relationship.

According to a preferred embodiment of the present invention, the loading process of the application is modified so as to map the policy configuration of the application to the dependency relationship of plug-ins. In addition, the acquired dependency relationships of plug-ins are stored with the plug-in context entity, wherein the plug-in context entity is attached to a corresponding runtime object of the application. In this way, it is possible to locate directly the depended-on plug-ins, without querying the policy registry and plug-in registry in execution of the application.

According to a preferred embodiment of the present invention, the application's functional logic may be separated from its non-function logic easily, quickly, and extensibly.

Besides, according to a preferred embodiment of the present invention, relevant plug-ins may be invoked directly when the application is executed, without querying the registry for location; the operating performance is therefore improved.

As compared to AOP technology, the present invention allows a global view of an application to be held such that a complicated policy of transaction may be implemented. Moreover, the infrastructure service for the policy could be developed in an extensible way.

As compared to the policy in the current application container (Java for example), the present invention allows development of infrastructure service in an extensible way, and only the J2EE container supplier may modify or extend the infrastructure service in the current application container.

Compared with traditional extension mechanism, the present invention enables implicit invocation to infrastructure service plug-ins in terms of application configuration.

BRIEF DESCRIPTION OF THE DRAWINGS

With the aid of detailed description in conjunction with the attached figures, the present invention will be comprehended more easily, wherein the same reference numbers in attached figures indicate the same elements, and in the attached figures.

DETAILED DESCRIPTION OF THE PREFERRED EMBODIMENTS

In the following, the system architecture of the present invention is described by referring to FIG. 1, which supports separation of functional logic from non-function logic according to the present invention.

Figure 1:
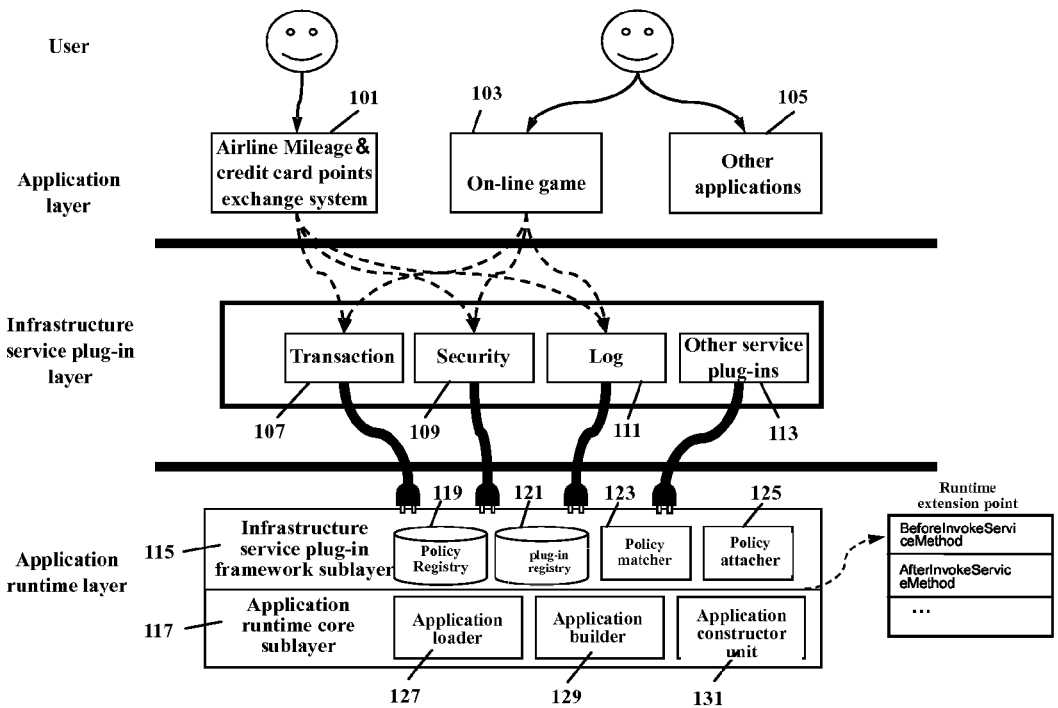
FIG. 1 shows a diagram of the system architecture supporting separation of functional logic from non-function logic according to the present invention.

As shown in FIG. 1, the system architecture from the bottom up is divided into 3 layers, namely application runtime layer, infrastructure service plug-in layer, and application layer.

Application runtime layer includes two sublayers, namely the application runtime core sublayer 117 and infrastructure service plug-in framework sublayer 115.

The application runtime core sublayer 117 includes the following parts: application loader 127, application builder 129, and application constructor unit 131. Application builder 129 generates runtime objects for components of the application and linking between components. In the application bootstrap period (namely a period of preparing for operation), application builder 129 is utilized. Application constructor unit 131 is used in creating a component instance or establishing communication between component instances. In the application's running period, application constructor unit 131 is utilized. The above-mentioned parts are provided with the functions known to those having ordinary skill in the art, although they are somewhat modified to implement the present invention; wherein, application constructor unit 131 is modified to add runtime extension points such as BeforeComponentInstanceCreation and AfterComponentInstanceCreation etc., of which the runtime extension point refers to the extension point to be invoked by application runtime core sublayer 117. It is obvious according to the reference to Eclipse that extension point means a certain point provided in an application, and a third party may utilize the point to add its own functional modules in an application to extend its existing application. Application loader 127 is modified to invoke the policy attacher 125 that will be described below, the policy attacher 125 may query the plug-in registry as described below based on the policy demand configuration from application loader 127 to map the application's policy configuration to the supported plug-in. Application builder 129 is modified so that it not only generates an application runtime object, but also generates an interrelated plug-in context according to the input from the policy adapter. The so-called plug-in context includes the services offered by the plug-ins and invocation of other plug-ins related thereto.

The infrastructure service plug-in framework sublayer 115 includes the following: plug-in registry 121 and policy attacher 125. Alternatively, policy registry 119 and policy matcher 123 may be included. Policy registry 119 stores policies supported by plug-ins and relationship between the policies, for example the policy containing relation, such as individual identity authentication including password authentication, fingerprint authentication, and iris authentication etc. In fact, policy registry 119 defines the policy capability that the system supports. Plug-in registry 121 stores information on relevant plug-ins and relationships between plug-ins. These relationships include the extension relationship and/or dependency relationship between plug-ins, for example. According to the present invention, policy attacher 125 may directly query plug-in registry 121 and map the application's policy configuration to the supported plug-ins, and return an association relationship between the policy demand configuration and the supported plug-ins. In such a case, the definition of the policy demand configuration must be nailed down to each individual plug-in. In other words, the entry for the plug-in registry should be defined still more specifically, and this may be relatively complicated and relatively time consuming. According to a preferred embodiment of the present invention, policy attacher 125 may transfer the definition of policy demand configuration to the policy matcher 123 first, and the policy matcher 123 may thus analyze and find out the required policy, and query policy registry 119 to determine whether or not the architecture of the system supports the required policy configuration. If yes, it will correspondingly query plug-in registry 121 and acquire the association relationship (namely handle) between policy and plug-in, and send it to the policy attacher 125. In such a case, the system running efficiency may be enhanced, and the bootstrap time may be reduced.

In accordance with the acquired association relationship, policy attacher 125 may generate plug-in context definition of the application, including the association (namely handle) with the plug-in instances and send it to the application builder 129.

Infrastructure service plug-in layer includes all types of service plug-ins developed by the infrastructure service developer on the basis of the non-function logic provided by application runtime layer and provided for the application layer, such as transaction 107, security 109, log 111, and other service plug-in 113. The other service plug-in 113 may be any plug-in that may be implemented on the application runtime layer. These service plug-ins may be implemented by expanding the runtime extension points.

Application layer includes various applications that the user (for instance, the software developer) intends to implement, such as Airline Mileage and credit card points exchange system 101, on-line game 103, and other application 105. The other application 105 may be any application that requires invoking the service plug-ins provided by the infrastructure service plug-in layer. When a user implements the application on a platform based on the present system architecture, the functional logic will be implemented in the application layer, and the infrastructure service plug-ins will be invoked via the runtime extension point defined in application constructor unit 131 according to the policy demand configuration so as to implement the non-function logic. With a combination of functional logic and non-function logic, the application intended by the user can be implemented finally.

Besides, it is allowed to further define extension points in the plug-in that point to other plug-ins to implement further functions. As above-mentioned, the relationship between plug-ins includes extension relationship and/or dependency relationship, and the relationship is also stored in the plug-in registry 121. Certainly, other relationships between plug-ins may be defined if necessary. Herein, the extension relationship between plug-ins indicates that other extension points may be provided in a plug-in, and the extension point can be extended only when certain conditions are satisfied. Dependency relationship indicates that instantiation of a plug-in in runtime depends on the implementation result of another plug-in. Examples will be given in the following to explain the two types of relationships between plug-ins.

Figure 2:
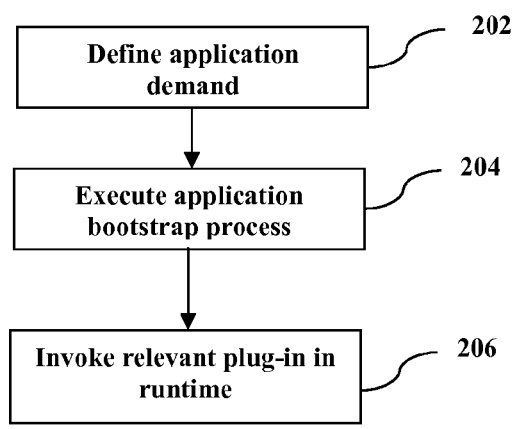
FIG. 2 shows a flow chart of implementation of intended application on the basis of system architecture as shown in FIG. 1.

FIG. 2 shows the process in which the user implements the intended application on the basis of the system architecture according to the present invention.

In step 202, the user defines functional logic and policy demand configuration on a platform based on the system architecture of the present invention, and loads them into the memory. The user may define function modules in any programming language on any programming platform; for instance, the user may program function modules in Java language on the Windows™ development platform, with a statement made where a non-function module needs to be invoked. In other words, the demand description should be given.

In step 204, application bootstrap process is conducted in memory. Specific execution process of step 204 will be described detailedly in the following.

In step 206, application constructor unit 131 is utilized to extend the extension point generated in step 204 in runtime, in other words, injection point of plug-in is invoked, and instances of corresponding plug-ins are created in runtime so as to execute corresponding function.

Figure 3:
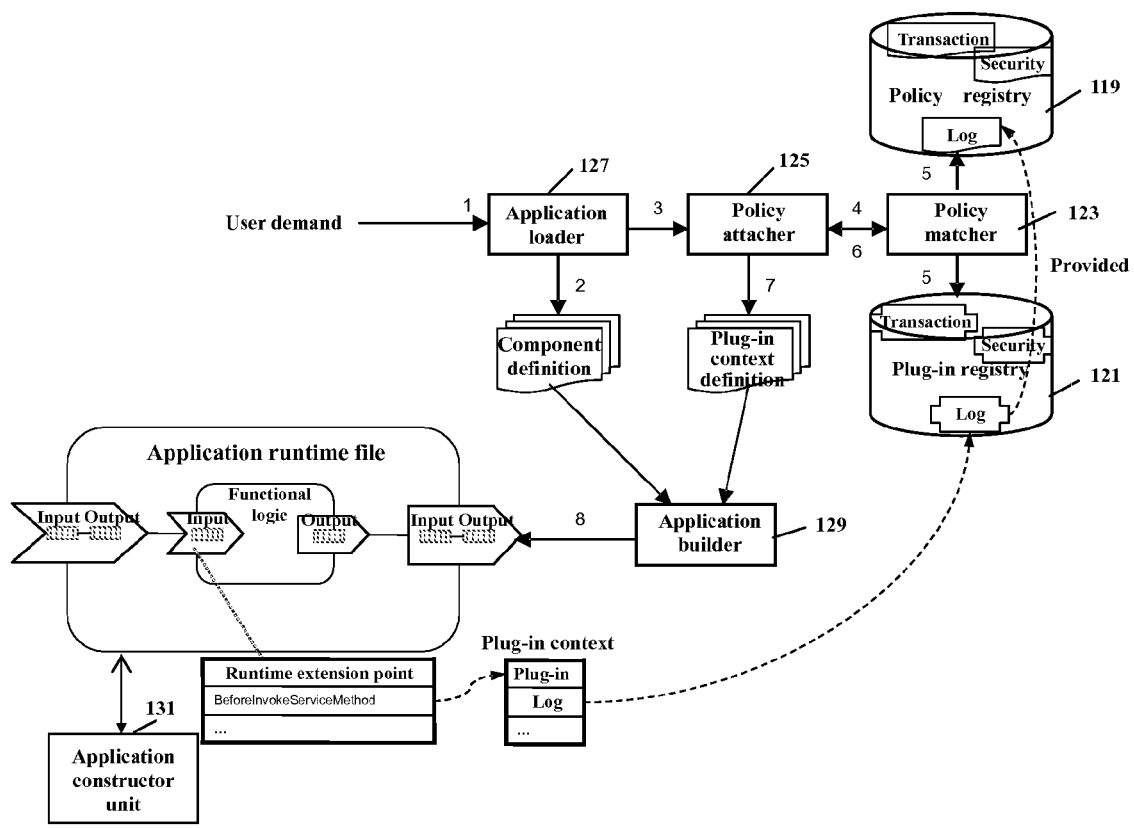
FIG. 3 shows a flow chart of an information stream of application bootstrap process according to system architecture of the present invention.

FIG. 3 shows a flow direction of an information stream in an application bootstrap process in the system architecture according to the present invention, in which, Information flow 1 includes component function of the application and policy demand configuration defined separately according to function demand and non-function demand;

Information flow 2 includes component functions of the application defined according to function demand;

The information flows 3, 4, and 5 include the policy demand configuration information defined according to non-function demand, which may be in the same or different forms in application loader 127, policy attacher 125, and policy matcher 123 as necessary.

Information flow 6 includes the association relationship between the acquired policy and the supported plug-in, such as the description and handles of a plug-in required for implementation of the non-function.

Information flow 7 includes the plug-in context definition, which is part of the plug-in context related to the plug-in; the plug-in context defines the services provided by the plug-in and reference of other plug-in associated thereto.

The information flow 8 includes application runtime objects, plug-in context objects, and their association.

Figure 4:
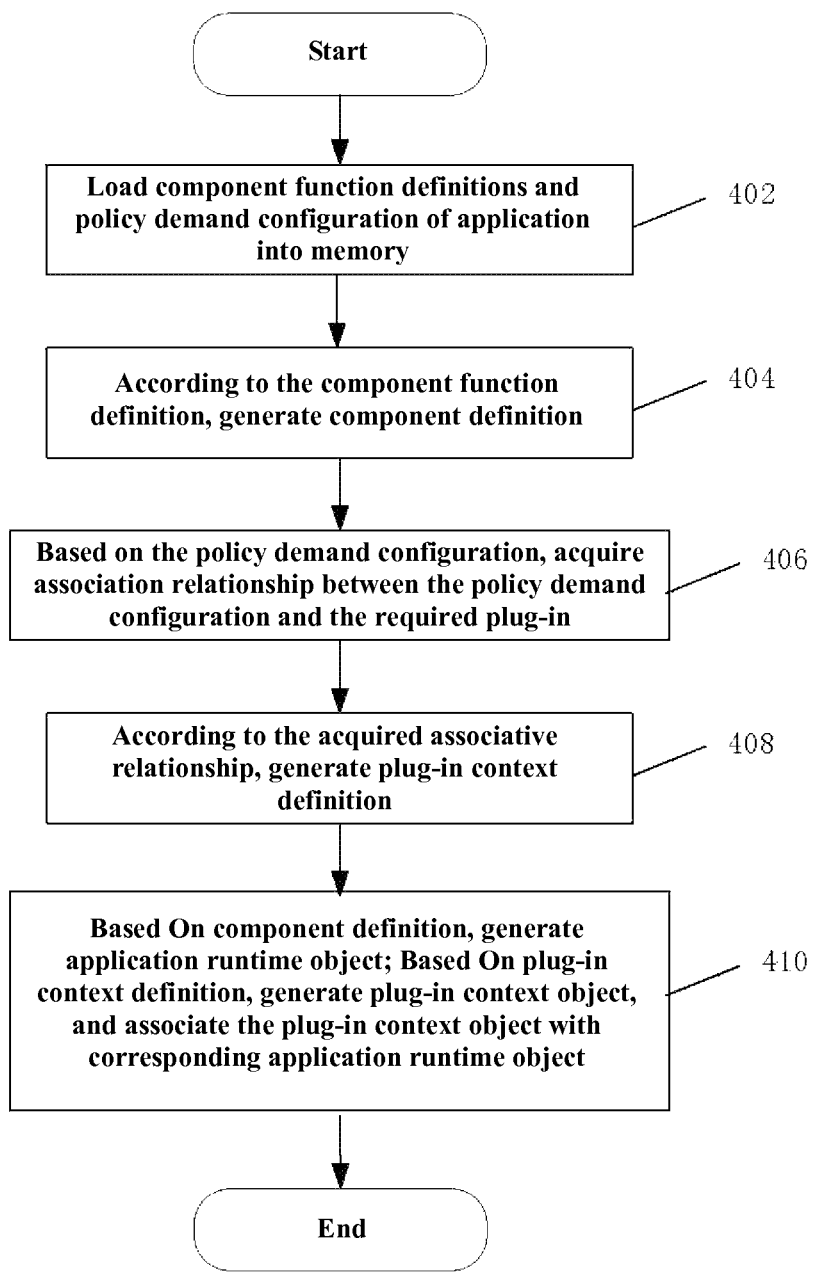
FIG. 4 shows a flow chart of application bootstrap process according to system architecture of the present invention.

In the following, the application bootstrap process in the system architecture according to the present invention is described by referring to FIG. 4.

In step 402, application loader 127 loads the component function definition and the policy demand configuration of the application into the memory, in other words, deploys the application package into the application runtime. The so-called application runtime indicates that the application package had been loaded into the memory, here the application package is already in "ready" mode and allows invocation at any time.

In step 404, application loader 127 generates a component definition (namely functional logic module) according to component function definitions and transfers the policy demand configuration to policy attacher 125 and then to policy matcher 123; in such a process, the policy demand configuration may have different forms as required.

The loading of a component function definition of the application and generating of component definition may be fulfilled by using the existing technologies; for example, the application running which uses the running environment Tuscany of SCA (Service Component Architecture) as a basic layer may be implemented; therefore the detailed description is omitted herein. In addition, the above-mentioned process is unnecessary for implementing the objects of the present invention.

In step 406, policy matcher 123 queries the plug-in registry 121 on the basis of policy demand configuration to acquire the supported plug-ins for the policy demand configuration, and return association relationships between the policy and the required plug-ins (including the plug-in description and handle) to the policy attacher 125. Alternatively, in step 406, policy matcher 123 queries policy registry 119 first so as to find out whether or not the system supports the required plug-ins. If so, it will query plug-in registry 121 and return the association relationship between the policy and the required plug-ins; otherwise, it will return the instruction for abnormality.

In step 408, according to the received description and handle of the plug-in, policy attacher 125 generates a plug-in context definition for the plug-in; the plug-in context definition being part of the plug-in context related to the plug-in; wherein, the plug-in context defines the service provided by the plug-in which is associated with the handle of the plug-in, and the reference of other plug-ins related to it; of which, the plug-in context may be formed as a chain table, tree-shape structure, or any other structures known to those having ordinary skill in the art.

In step 410, application builder 129 generates application runtime objects on the basis of component definitions, generates plug-in context objects on the basis of plug-in context definitions, and associates the plug-in context object with a corresponding application runtime object; wherein, the plug-in context object is an instantiated plug-in context definition.

Figure 5:
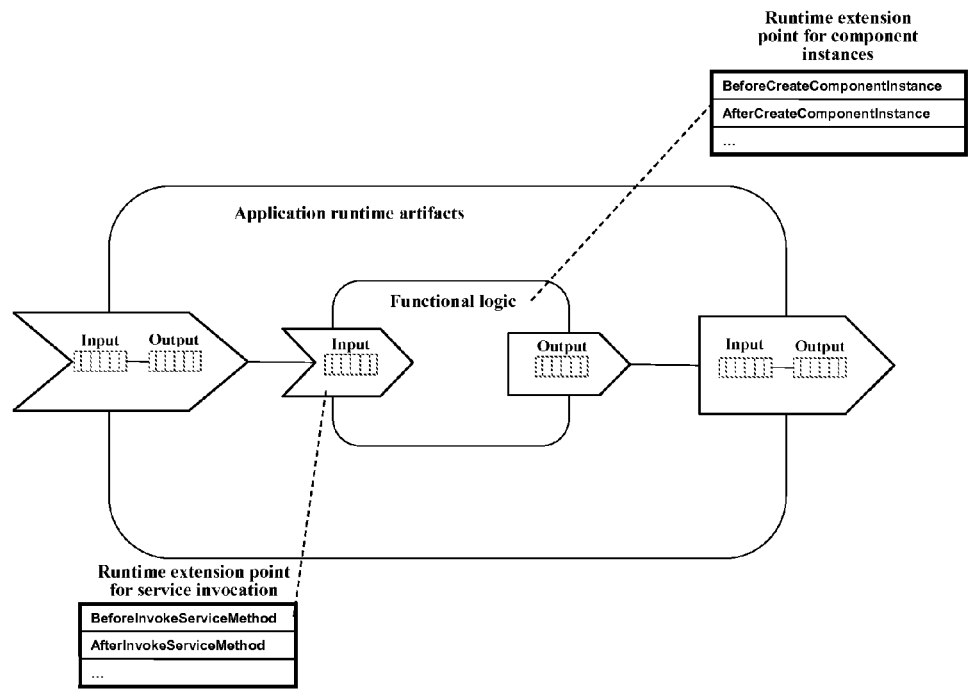
FIG. 5 shows a view of relationship between the runtime extension point and runtime application object.

FIG. 5 shows the relationship between the runtime extension point and runtime application object. As shown in FIG. 5, the application runtime object is associated with multiple runtime extension points; the runtime extension points includes two classes, one class is extension points related to service invocation such as extension point before invoking component instances BeforeInvokeServiceMethod and extension point after invoking component instances AfterInvokeServiceMethod; the other class is the extension points related to component creating such as the extension points before creating component instance BeforeCreateComponentInstance and the extension points after creating component instance AfterCreateComponentInstance. When constructor creates instances of the runtime extension point in the interaction process with user, the system may find out and invoke corresponding plug-in directly from the association relationship with the plug-in instances contained in plug-in context.

In the following, we'd take the on-line payment system as an example to explain the referential implementation of the present invention. In this referential implementation, SCA (Service Component Architecture) runtime environment Tuscany may be utilized as application runtime environment for the basic layers. Here simplified pseudo codes are utilized so as to illustrate the following mechanism better. Given as typical example, infrastructure service plug-in "log" may be implemented in infrastructure service plug-in layer shown in FIG. 1. Besides, the on-line payment system is given as atypical example of an application to show how to use "log" plug-ins. The application adopts Paypal to offer on-line payment service, and the user uses "log" to record the use of the Paypal service.

1. Modification of Application Runtime Core Sublayer 117

Modification of the application runtime core sublayer 117 includes the modification of application constructor unit 131, application loader 127, and application builder 129. The following pseudo codes for the modification are underlined.

First of all, to allow the application runtime to be aware of the Paypal component's demands for log and thus invoke "log", the runtime application loader 127 "ComponentLoader" should be modified as follows to create plug-in context definition:

```
// Tuscany loader for loading component tag information of scdl files
public class ComponentLoader extends LoaderExtension<ComponentDefinition<?>> {
    PluginContextDefinition pcd = null; //Types of plug-in definition information
    public ComponentDefinition<?> load(CompositeComponent parent,
            XMLStreamReader reader, DeploymentContext deploymentContext)
        throws XMLStreamException, LoaderException {
        ...
        //parse of plug-in definition information
        String intents = reader.getAttributeValue(null,"requires");
        pcd = processListofIntent(intents);
        ...
    }
}
```

The method "ComponentLoader" will parse application configuration and identify some key words such as "demand". Key word "demand" is used for designating the intended infrastructure service (intent). Method "processListofIntent" may invoke policy attacher 125 to generate corresponding plug-in context definition.

Secondly, the application builder 129 i.e. "JavaComponentBuilder" should be modified as follows to associate the plug-in context and corresponding component:

```
//Tuscany core API for establishing component according to component definition
public class JavaComponentBuilder extends
    ComponentBuilderExtension<JavaImplementation> {
```

-continued

```
    public AtomicComponent build(CompositeComponent parent,
            ComponentDefinition<JavaImplementation> definition,
            DeploymentContext deployment) throws BuilderConfigException {
        ...
        JavaAtomicComponent component = new JavaAtomicComponent (definition
                .getName( ), configuration);
        // Create plug-in context
        component.createPluginContext(definition.getPluginContextDefinition());
    }
}
```

Finally, to ensure runtime being extensible, the runtime extension points in runtime application constructor unit 131 should be indicated. In order to implement the extension point activated before invoking service "BeforeInvokeServiceMethod", the extension point "BeforeInvokeServiceMethod" should be declared before acquiring component instances and invoking its service; afterwards, when implementing application constructor unit 131, the extension point "System.BeforeInvokeServiceMethod" extended by all plug-ins should be obtained from the plugin context acquired by application builder 129, with release of links to each plug-in, addition of its sub-plug-in context and run the plug-in should be run. The following shows the modification of service invocation class "PojoTargetInvoker"

2. Implementation of Infrastructure Service Plug-in Framework Sublayer 115

The infrastructure service plug-in framework sublayer 115 includes the plug-in registry 121, policy matcher 123, and policy attacher 125. Alternatively, it may also include policy registry 119.

First of all, the plug-in registry maintains information of plug-in (for example, the provided policy) and relationships between the plug-ins (extension relationship and/or dependency relationship). The following shows the implementation of plug-in registry 121, which indexes plug-in according to policy and indexes plug-in according to extension points:

```
//Tuscany core API for invoking component service
public abstract class PojoTargetInvoker implements TargetInvoker {
    public Object invokeTarget(final Object payload)
            throws InvocationTargetException {
        try {
            ...
            //Activate extension point management function
            processBeforeInvokeServiceMethod(payload,instance);
            Object ret;
            //Acquire component instance and invoke its service
            if (payload != null && !payload.getClass( ).isArray( )) {
                ret = operation.invoke(instance, payload);
            } else {
                ret = operation.invoke(instance, (Object[ ]) payload);
            }
            return ret;
        } catch (IllegalAccessException e) {
            ...
        }
    }
}
//Activate all plug-ins extending this extension point
public void processBeforeInvokeServiceMethod (object payload,
                AtomicComponentExtension instance) {
    //Acquire plug-in context from component instances
    PluginContextpc= instance.getPluginContext();
    //find out all plug-ins extended "System.BeforeInvokeServiceMethod" extension point from
    plug-in context
    List<Extension> elist = pc.getExtension("System.BeforeInvokeServiceMethod");
    //Execute all plug-ins
    For(Extension e: elist)
    {
        e.run();
    }
}
}
```

With the method "processBeforeInvokeServiceMethod", plug-in context of current component instances may be acquired. According to the context, acquire the reference "e" of plug-in "log", which extends the extension point "BeforeInvokeServiceMethod" and then invoke "log". Notice that the invocation of "log" occurs before service invocation, operation.invoke( ).

```
//Define registry to index plug-ins
public class PluginRegistry {
    public List<Plugin> getPluginsByPolicy(Policy policy);
    public List<Plugin> getPluginsByExtensionPoint(ExtensionPoint ep);
}
```

Plug-in class maintains the provided plug-in extension and extension point. The following shows implementation of extension of extension point in plug-ins and of the extension points providing plug-ins that have an extension relationship and a dependency relationship with the plug-in:

```
//Plug-in definition
public class Plugin{
    public List<Extension> getExtensions( );
    public List<ExtensionPoint> getExtensionPoints( );
    public List<Plugin> getDependentPlugins( );
}
```

Secondly, the policy registry 119 maintains the mapping between demand and policy of infrastructure service, wherein, the policy describes some mutual capability or constraint that may be applied in the service components or between service components. The following shows the implementation of acquiring policy according to demands:

```
//Define registry to index policy
public class PolicyRegistry {
    public Policy getPolicy(String intent);
}
```

Thirdly, policy matcher 123 is responsible for finding out the supported plug-ins for demand. The following shows the implementation of acquiring policy according to demand and then acquiring plug-in according to policy:

```
//Provide the matcher between policy and plug-in
public class PolicyMatcher {
    public List<Plugin> getPlugins (String intent){
        Policy policy = PolicyRegistry. getPolicy(intent);
        return PluginRegistry. getPluginsByPolicy(policy);
    }
}
```

Finally, policy attacher 125 generates the context definition of the supported plug-in for demand. Method "generatePluginContextDefinition" constructs a plug-in context definition for the plug-in, while the method "buildPluginContextChain" organizes the plug-in context definitions as a chain table according to the plug-in relationship, and returns the heading of the chain table. The above-mentioned method finds out all plug-ins according to each policy, finds out a corresponding plug-in definition from plug-in registry 121, and establishes a plug-in definition context.

```
// provide a mechanism to obtain plug-in definition context from policys
public class PolicyAttacher{
    public List<PluginContextDefinition> getPluginContextDefinition(String intents){
        List<String> intentList=getIntents(requires,policySets);
        List<PluginContextDefinition> result = new List<PluginContextDefinition>;
        for(String intent: intentList){
            //Find out all plug-ins according to each policy
            List<Plugin> plugins= PolicyMatcher. getPlugins(intent);
            //Find out corresponding plug-in definition
            List< PluginContextDefinition> pluginContextDefinitions =
                        generatePluginContextDefinition(plugins)
            //Establish plug-in definition context
            PluginContextDefinition pluginContextDefinitionHeader =
                        buildPluginContextChain(pluginContextDefinitions,plugins);
            result.add(pluginContextDefinition);
        }
        return result;
    }
}
```

Method "PluginContextDefintion" provides a modes to establish context tree for the required plug-in hierarchical structure.

```
//Define the plug-in context definition
public class PluginContextDefinition extends ModelObject {
    public PluginContextDefinition(Plugin plugin);
    public void addChild(PluginContextDefinition pcd);
    public List<PluginContextDefinition> getChildren( );
    public List<Extension> getExtensions(ExtensionPoint ep);
}
```

3. Implementation of Log Plug-in

Plug-in configuration designates the extension points to be extended and the extension it provides. Here, the extension point "filter" that has an extension relationship with "log" plug-in is given. The following shows the configuration of "log" plug-in.

```
<composite xmlns=http://www.osoa.org/xmlns/sca/1.0
    xmlns:system=http://incubator.apache.org/tuscany/xmlns/system/1.0
    name="com.ibm.crl.plugin.log">
    <component name="LogService">
        <implementation.java
            class="com.ibm.crl.plugin.log.LogProcessor"/>
        <extension id="com.ibm.crl.plugin.log.LogProcessor"
            extension-point="system.BeforeInvokeServiceMethod" />
            // Extension
        <extension-point id="com.ibm.crl.plugin.log.Filter"
            interface.class="com.ibm.crl.plugin.log.IFilter" />
            //Extension point
    </component>
</composite>
```

Log service invokes relevant information by "Log" plug-in extending the extension point "BeforeInvokeServiceMethod". The following shows the specific implementation of "log" plug-in.

```
public class LogProcessor implements BeforeInvokeServiceMethod {
    private Logger log = Logger.getLogger(this.getClass( )); // logger
    started
    public void run( ) {
    log.info (" componentname: "+ componentname + " operation: "
    + operation + " args: " +
    args + " Timestamp: " + System.currentTimeMillis( )); // logger
    recording
    }
    ...
}
```

4. Relevant Codes and Configuration of On-Line Payment System

The following shows pseudo codes of Paypal component provided with log codes.

```
public class EPaypelServiceImpl implements EPaypelService {
    private Logger log = Logger.getLogger(this.getClass( ));//Log code
    ...
    public List requestPayment(String companyName)
    {
        log.info (" Classname: " + this.getClass( ) + " operation:
        requestPayment " + " args: " +companyName+
        " timestamp: " +System.currentTimeMillis( )); //Log code
        doSomething( );
        ...
    }
    ...
}
```

With the "log" plug-in, log demand may be added simply to the configuration of an on-line payment application such that the log codes may be deleted from the application codes. The following shows the configuration of an on-line payment system, wherein the log demand is indicated with underlining.

```
<composite xmlns="http://www.osoa.org/xmlns/sca/1.0"
    name="Online Payment">
    ...
    <component name="EPaypelService" requires="log">
        <implementation.java
            class="com.ibm.crl.paypel.EPaypelServiceImpl" />
        <reference name="paymentManagementOagis">
            PaymentManagementComponent
        </reference>
    </component>
    ...
</composite>
```

In the following, "log" plug-in will be taken as an example to show the extension relationship between plug-ins.

Assume that "log" plug-in provides the capability of creating log component instances and invoking a service method. In addition, the "log" plug-in provides extension points "filter" so as to add a filtering condition.

Moreover, plugin "ABC filter" may extend the extension point "filter" of plug-in "log" so that only the information conforming to "ABC" condition is logged.

Figure 6:
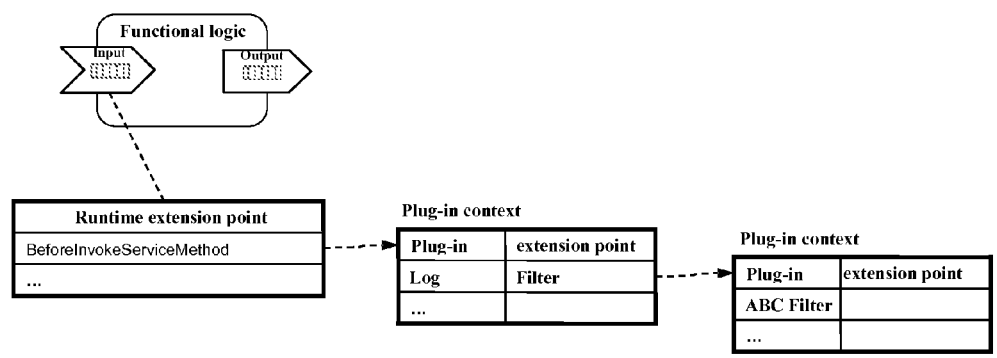
FIG. 6 exemplarily shows a view of extension relationship between plug-ins in the plug-in context.

FIG. 6 shows how to utilize plug-in context to locate plug-in's plug-in, without having to additionally query policy registry 119 and plug-in registry 121 in execution of an application.

In this example, the plug-in context stores the extension points, that is, extension point "filter". In addition, the extension point "filter" points to another plug-in context which stores the extension "ABC filter" of the required extension point, in other words, it extends the extension point "filter" and requires plug-in "ABC filter" here.

In the following, the above-mentioned "log" plug-in will be taken as an example to show the dependency relationship between plug-ins.

Assuming that "monitor" plug-in exists and provides each identity with a capability of monitoring the creation of component instances and method invocation. Besides, plug-in provides service so as to acquire the number of current component instances of the selected identity.

At the same time, "resource management" plug-in provides a capability of limiting the maximum number of component instances of each identity. The plug-in supports "monitor" plug-in to acquire the current number of component instances before component instance is created for each identity.

Figure 7:
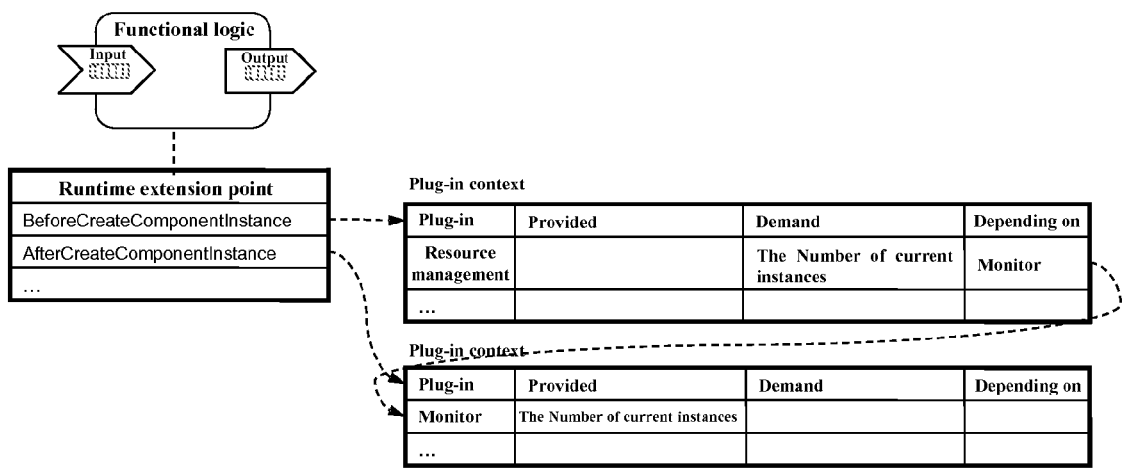
FIG. 7 exemplarily shows a view of dependency relationship between plug-ins in the plug-in context.

FIG. 7 show how to apply plug-in context to dependency plug-in of a plug-in, without additionally querying policy registry 119 and plug-in registry 121 in execution of an application.

Plug-in context stores the services provided and required by the plug-in. In addition, it also stores reference of dependency plug-in (namely the plug-in that provides the required service). In this example, service provided by the plug-in is to limit the maximum number of component instances, while the service it requires is extension point "monitor" to provide the number of current instances. The extension point "monitor" points to another plug-in context, and it stores the extension "monitor" of the required extension point, in other words, it extends the extension point "monitor" and requires plug-in "monitor" here.

Figure 8:
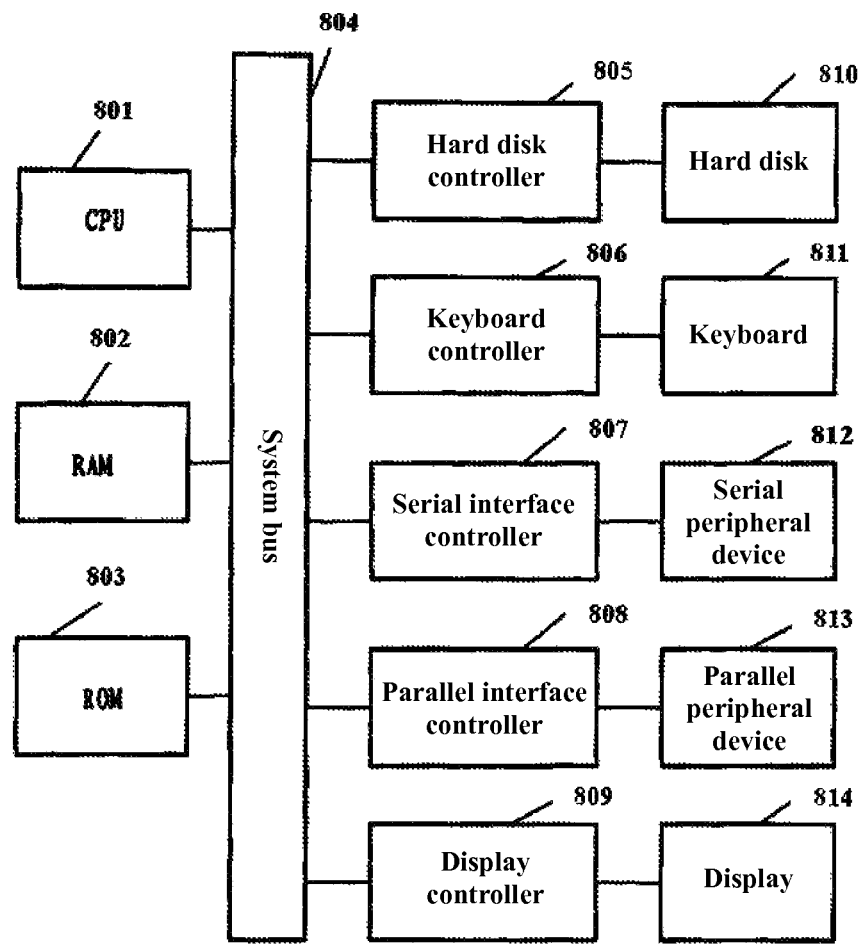
FIG. 8 shows schematically the computer system in which the embodiments of the present invention can be implemented.

FIG. 8 shows schematically the computer system in which the embodiments of the present invention can be implemented. The computer system shown in FIG. 8 includes CPU (Central Processing Unit) 801, RAM (Random Access Memory) 802, ROM (Read Only Memory) 803, system bus 804, HD (Hard Disk) controller 805, keyboard controller 806, serial interface controller 807, parallel interface controller 808, display controller 809, hard disk 810, keyboard 811, serial peripheral device 812, parallel peripheral device 813, and display 814. Among these components, those that are connected to system bus 804 include CPU 801, RAM 802, ROM 803, HD controller 805, keyboard controller 806, serial interface controller 807, parallel interface controller 808, and display controller 809. Hard disk 810 is connected to HD controller 805, keyboard 811 is connected to keyboard controller 806, serial peripheral device 812 is connected to serial interface controller 807, parallel peripheral device 813 is connected to parallel interface controller 808, and display 814 is connected to display controller 809.

The functions of each component in FIG. 8 are known to all in the technical field, and the structure shown in FIG. 8 is regular. This type of structure is not only applied in personal computers but also applied in any development platform that supports a user to develop the applications he requires. Some components shown in FIG. 8 may be omitted for different applications. The entire system shown in FIG. 8 is usually stored as software in hard disk 810, EPROM, or other non-volatile memory for computer-readable instruction control. Software may also be downloaded from network (unshown in the figure). Or the software downloaded from network may be stored in hard disk 810 and loaded to RAM 802 and executed by CPU 801 so as to fulfill the functions determined by the software.

Although the computer system described in FIG. 8 may support the method adopted by the present invention, the computer system is only an example of the computer systems. Those ordinary skilled in the art may comprehend that many other computer systems may also implement the present invention.

The present invention may also be implemented as a computer program product applied in the computer systems, for example, the one shown in FIG. 8, and it contains the codes applicable to the methods adopted by the present invention. Prior to usage, codes may be stored in memory of another computer system, for example a hard disk, or portable memories such as CD or floppy disk, or downloaded to a computer storage medium via Internet or other computer networks.

Many features and advantages of the present invention are apparent from the above description, and it is intended to cover all such features and advantages of the present invention by the appended claims. In addition, it will be understood by those ordinary skilled in the art that a lot of modifications and changes is possible, therefore it is unnecessary to limit the present invention to the specific construction and operation as shown and described. Hence all applicable modifications and equivalents may be considered to fall in the scope of the present invention.

The invention claimed is:

1. A method executed by a central processing unit (CPU) of implementing non-function logic for a plurality of applications extensibly and independently of functional logic for each of the plurality of applications, comprising the steps of:
   acquiring an association relationship between a policy and a plug-in required by the application based on a loaded policy demand configuration of the application by querying a plug-in registry containing information on description of the plug-ins and on relationships between the plug-ins based on the policy demand configuration;
   generating a plug-in context definition according to the acquired association relationship, the plug-in context definition being part of a plug-in context associated with the plug-in, wherein the plug-in context defines services provided by the plug-in and reference to other plug-ins related to the plug-in;
   generating an application runtime object based on a component definition;
   generating a plug-in context object based on the plug-in context definition, wherein the plug-in context object is an instantiated plug-in context definition; and
   associating the plug-in context object to the application runtime object so as to implement a function of the plug-in for the application.

2. The method as claimed in claim 1, wherein the step of acquiring association relationship between a policy and a required plug-in based on a loaded policy demand configuration further includes:
   querying a policy registry containing information on policies supported by the plug-ins and on relationships between the policies based on the policy demand configuration; and
   mapping the policy demand configuration to corresponding plug-in by further querying the plug-in registry based on the result of querying the policy registry so as to acquire the association relationship between the policy and the required plug-in, wherein the plug-in registry contains information on description of the plug-ins and on relationships between the plug-ins.

3. The method as claimed in claim 1, further comprising the step of defining the policy demand configuration of an application.

4. The method as claimed in claim 3, further comprising steps of:
   defining the component function of the application; and
   generating a component definition according to a loaded component function definition.

5. The method as claimed in claim 1, wherein the plug-in context is formed as a chain table or a tree structure.

6. The method as claimed in claim 1, wherein the plug-in registry further includes definition of extension relationship and/or dependency relationship between plug-ins, wherein the extension relationship indicates that a plug-in further includes definition of a extension point pointing to another plug-in, while the dependency relationship indicates that instantiation of a plug-in depends on implementation of another plug-in.

7. An apparatus for implementing non-function logic for a plurality of applications extensibly and independently of functional logic for each one of the plurality of applications, comprising:
   at least one processor; and
   an application loader for loading policy demand configuration of an application;
   a policy attacher for acquiring association relationship between a policy and a plug-in required by the application based on a loaded policy demand configuration of the application, and for generating a plug-in context definition according to the acquired association relationship, the plug-in context definition being part of a plug-in context associated with the plug-in, wherein the plug-in context defines services provided by the plug-in and reference to other plug-ins related to the plug-in;
   an application builder for generating an application runtime object based on a component definition and generating a plug-in context object based on the plug-in context definition, wherein the plug-in context object is an instantiated plug-in context definition;
   an application constructor unit for associating the plug-in context object to the application runtime object so as to implement a function of the plug-in for the application; and
   a plug-in registry unit for storing a plug-in registry containing information on description of the plug-ins and on relationships between the plug-ins;
   wherein the policy attacher acquires the association relationship between the policy and the required plug-in by querying the plug-in registry based on the policy demand configuration.

8. The apparatus as claimed in claim 7, the apparatus further comprising:
   a policy registry unit for storing a policy registry containing information on policies supported by the plug-ins and on relationships between the policies;
   wherein the policy attacher queries the policy registry based on the policy demand configuration, and maps the policy demand configuration to the supported plug-in by further querying the plug-in registry based on the result of querying the policy registry so as to acquire the association relationship between the policy and the required plug-in, wherein the plug-in registry contains information on description of the plug-ins and on relationships between the plug-ins.

9. The apparatus as claimed in claim 7, wherein, the application loader further loads at least one component function definition of the application.

10. The apparatus as claimed in claim 9, wherein,
   the policy attacher further generates application runtime objects based on the component function definition.

11. The apparatus as claimed in claim 7, wherein the plug-in context is formed as a chain table or a tree structure.

12. The apparatus as claimed in claim 7, wherein the plug-in registry further includes definition of extension relationship and/or dependency relationship between plug-ins, wherein the extension relationship indicates that a plug-in further includes definition of a extension point pointing to another plug-in, while the dependency relationship indicates that instantiation of a plug-in depends on implementation of another plug-in.

13. A system for separating functional logic of an application from non-function logic for any of a plurality of applications and implementing the non-function logic, including:
a central processing unit;
an application runtime layer entity configured to implement functional logic by user and utilize plug-ins provided by an infrastructure service plug-in layer entity;
the infrastructure service plug-in layer entity configured to implement the plug-in by utilizing services provided by an application runtime layer entity; and
the application runtime layer entity configured to implement acquiring an association relationship between a policy and a plug-in required by the application based on a loaded policy demand configuration of the application by querying a plug-in registry containing information on description of the plug-ins and on relationships between the plug-ins based on the policy demand configuration, and further performing steps of:
generating a plug-in context definition according to the acquired association relationship, the plug-in context definition being part of a plug-in context associated with the plug-in, wherein the plug-in context defines services provided by the plug-in and reference to other plug-ins related to the plug-in;
generating an application runtime object based on a component definition;
generating a plug-in context object based on the plug-in context definition, wherein the plug-in context object is an instantiated plug-in context definition; and
associating the plug-in context object to the application runtime object so as to implement a function of the plug-in for the application.

* * * * *